United States Patent [19]
Morrissey, Jr. et al.

[11] Patent Number: 5,876,019
[45] Date of Patent: Mar. 2, 1999

[54] WINCHING APPARATUS FOR ALL-TERRAIN VEHICLE

[76] Inventors: Michael T. Morrissey, Jr., 211 Camp Garaywa Rd., Clinton; Roger Gunn, #5, Gavin Subdivision, Laurel, both of Miss.

[21] Appl. No.: 933,080

[22] Filed: Sep. 18, 1997

[51] Int. Cl.⁶ .................................................... B66D 3/02
[52] U.S. Cl. ......................... 254/323; 254/332; 414/540; 414/546
[58] Field of Search ................................. 254/323, 324, 254/328, 332, 325, 326, 327; 212/202, 223, 233, 241, 249; 414/540, 546, 744.4

[56] References Cited

U.S. PATENT DOCUMENTS

| | | |
|---|---|---|
| 1,732,153 | 10/1929 | Crichton . |
| 2,541,970 | 2/1951 | Pospisil .................................... 254/328 |
| 2,593,764 | 4/1952 | Kaunitz, Jr. . |
| 2,843,360 | 7/1958 | Proctor . |
| 3,001,763 | 9/1961 | Pilot . |
| 3,797,681 | 3/1974 | Brettrager ................................ 254/323 |
| 3,918,592 | 11/1975 | Paul . |
| 4,049,238 | 9/1977 | Brown . |
| 4,269,396 | 5/1981 | Easterwood ............................. 254/325 |
| 5,054,745 | 10/1991 | Swayze et al. ......................... 254/325 |
| 5,509,639 | 4/1996 | Ellis ....................................... 254/380 |

*Primary Examiner*—John M. Jillions
*Attorney, Agent, or Firm*—Nixon & Vanderhye

[57] ABSTRACT

The winch apparatus includes a pair of telescoping support arms mounted at their base ends to brackets secured to an all-terrain vehicle. The mounting brackets provide for pivotal movement of the support arms about mutually perpendicular axes. The opposite ends of the support arms are pivotally connected to a winch support plate. By adjusting the length of the support arms, the winch support plate and winch carried thereby can be directed to one side whereby the handle for operating the winch and the support arms do not interfere with one another during loading and unloading operations.

14 Claims, 4 Drawing Sheets

WINCHING APPARATUS FOR ALL-TERRAIN VEHICLE

The present invention relates to a winching apparatus for mounting on an all-terrain vehicle (ATV) and particularly relates to winching apparatus for lifting substantial loads onto and off a support rack or basket carried by the all-terrain vehicle.

BACKGROUND AND SUMMARY OF THE INVENTION

There are many instances where it is highly desirable to lift substantial loads onto a vehicle for transport to another location and then off-load the vehicle. At times, such loads are at remote locations where there may be only a single individual available for lifting the load onto the vehicle or off-loading the vehicle. For example, hunting areas are typically at remote locations and it is oftentimes very difficult to lift game such as deer, hogs, antelopes and the like onto a vehicle by a single hunter or even a pair of hunters for transport to another location. Frequently, all-terrain vehicles are used for this purpose because of their capability to access remote locations. However, even all-terrain vehicles require one or more individuals to lift the game onto a support rack or basket carried by the vehicle and oftentimes this cannot be accomplished by a single or even a pair of hunters.

The present invention minimizes or eliminates the foregoing and other problems associated with lifting loads such as game onto a vehicle for transport and particularly provides a portable winching apparatus which can be readily and easily releasably mounted on a vehicle such as an all-terrain vehicle and later easily removed from the vehicle. In a preferred form of the present invention, there is provided a pair of support arms and associated brackets for mounting the lifting arms on structural support members carried by the vehicle. The brackets, support arms and associated winching apparatus may be carried on or in the vehicle for setup at the remote location. At that site, the brackets are fastened to the vehicle support members and the support arms are pivotally connected to the mounting brackets. The opposite ends of the arms are pivotally connected to a winch mounting element, e.g., a plate, the opposite side of which carries a winch. The winch is conventional and includes a reel mounted to the mounting plate for rotation about an axis, a lifting line about the reel terminating in a hook, and a handle for rotating the reel. Various ancillary parts are also provided on the winch, for example, a ratchet mechanism including a pawl to catch the reel under load conditions and maintain the load at a certain elevation. A chain is also provided for securement between the winch mounting plate and another part of the vehicle such that winch can be disposed over the load to be lifted. The support arms are preferably telescopic and thus can be disposed in adjusted lengthwise positions.

While the present invention is not limited to all-terrain vehicles, it is particularly useful with such ATV's. An ATV typically has either a basket at the rear end of the vehicle or a tubing rack. The present invention is useful with either the basket or tubing rack. Particularly, two sets of mounting brackets are provided depending upon whether the winch is to be mounted to the basket or to the tubing rack. Basically, however, both brackets are in the form of plates which are clamped to a basket support frame or tubing. A sleeve is carried by one of the plates and has a cylindrical opening for receiving a cylindrical rod. The rod in the sleeve is therefore pivotal about a generally vertical axis. Base ends of the support arms are bifurcated and extend about opposite sides of the rod. The bifurcated base of each support arm is pinned to the upstanding rod for pivotal movement about a generally horizontal axis. Thus, the mounting brackets in both cases afford pivotal movement of the support arms about mutually perpendicular axes. Where the all-terrain vehicle employs a basket, the mounting bracket plates are clamped on opposite sides of the square support tubing of the basket. Where the all-terrain vehicle has a tubing rack, the plates are mounted above and below an adjacent pair of generally cylindrical tubing members.

In a preferred form of the present invention, the opposite ends of the support arms are secured to the winch mounting plate for pivotal movement about side by side, generally vertical discrete axes. The chain is then connected between the winch support plate and the vehicle such that the chain and support arms support the winch over the load. The winch may also be directed to one side of the support arms, i.e., lies askew relative to the support arms by selective adjustment of the length of the support arms. In that position, neither support arm interferes with the rotation of the winch handle. At the site, the winch is located over the load and the line is attached to the load, e.g., by use of the hook. The load can then be lifted by operating the winch. Once lifted to the required elevation, the load can be disposed over and transferred to the basket or tube rack on the all-terrain vehicle. Once the load is supported by the vehicle per se, the winching apparatus can be dismantled from the vehicle for later use or remain on the vehicle for off-loading purposes.

In a preferred embodiment according to the present invention, there is provided apparatus mountable on a vehicle for lifting loads comprising a pair of elongated support arms, a pair of mounting brackets for attachment to the vehicle, each support arm being pivotally mounted at one end to a respective mounting bracket for pivotal movement about generally perpendicular axes, a winch having a lifting line, a reel for the lifting line and carried for rotation about an axis and a handle for rotating the reel about the axis, a mounting element for carrying the winch and a discrete pivotal connection between an end of each support arm opposite one end and the mounting element enabling the winch and the mounting element to be directed to opposite sides of the arms.

In a further preferred embodiment according to the present invention, there is provided in a combination with an all-terrain vehicle having a body, wheels on the body and an engine carried by the body and a pair of fixed structural support members, a winching apparatus comprising a pair of elongated support arms, a pair of mounting brackets for securement to the structural support members carried by the vehicle, each support arm being pivotally mounted at one end to a respective mounting bracket for pivotal movement about generally perpendicular axes, a winch having a lifting line, a reel for the lifting line and carried for rotation about an axis and a handle for rotating the reel about the axis, a mounting element for carrying the winch, and discrete pivotal connections between opposite ends of the support arms from one end and the mounting element enabling the winch and the mounting elements to be directed to opposite sides of the arms.

Accordingly, it is a primary object of the present invention to provide a novel and improved winching apparatus for lifting loads onto and off a vehicle, particularly an all-terrain vehicle.

DETAILED DESCRIPTION OF THE DRAWINGS

Figure 1:
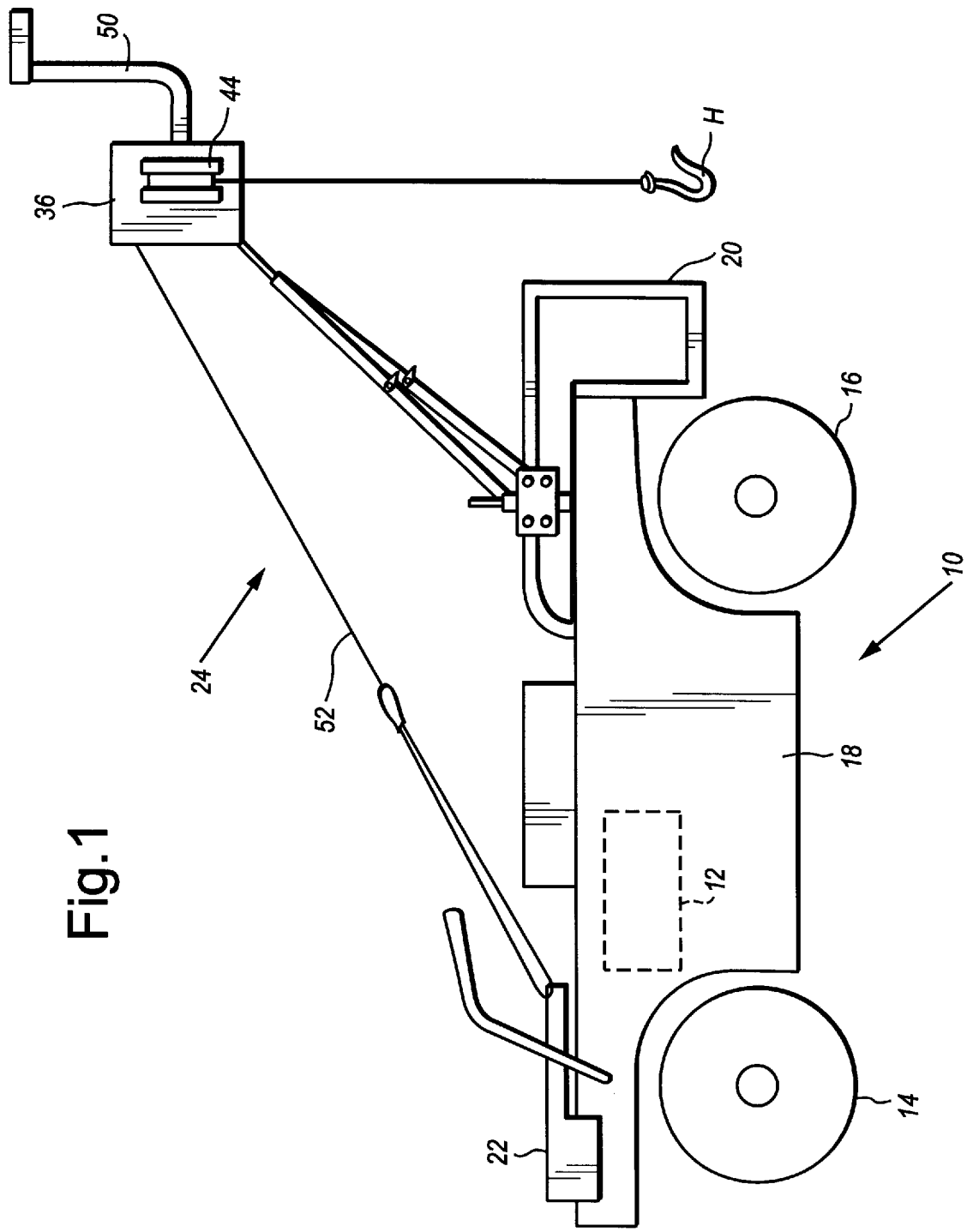
FIG. 1 is a schematic side elevational view of a winching apparatus mounted on an all-terrain vehicle in accordance with the present invention.
Figure 2:
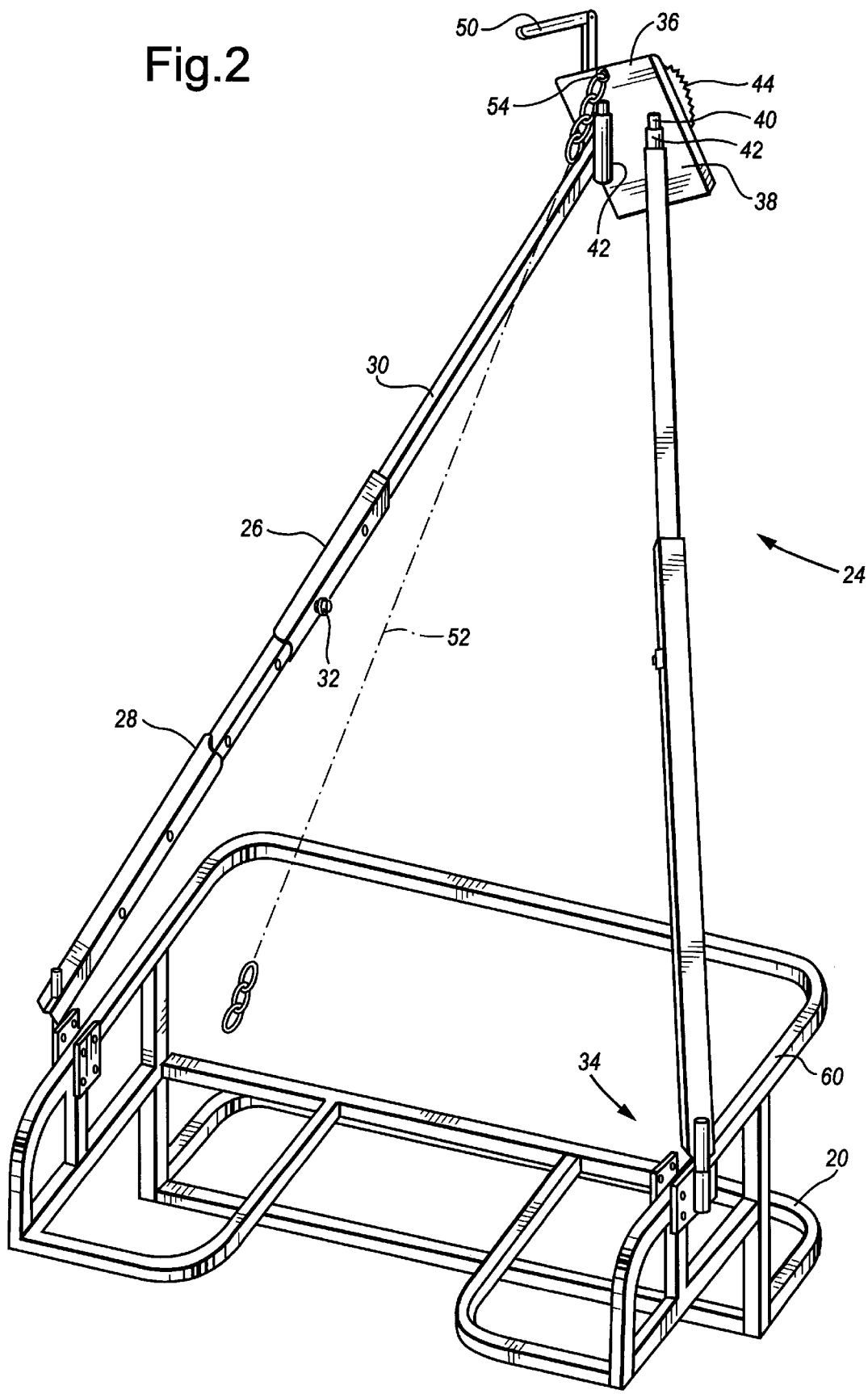
FIG. 2 is a perspective view illustrating the winching apparatus mounted on a rear basket carried by the all-terrain vehicle.

Referring now to the drawing figures, particularly to FIG. 1, there is illustrated an all-terrain vehicle (ATV) generally designated 10 having an engine schematically illustrated at 12, forward and rear wheels 14 and 16 and a body or chassis 18. The all-terrain vehicle 10 is conventional per se and further description of the vehicle is not believed necessary. Suffice it to say that the all-terrain vehicle is useful for gaining access to remote locations. Typically, an ATV has a rear basket 20 as well as a front basket 22, the rear basket 20 being illustrated in FIG. 2 as part of a support for a winch apparatus generally designated 24.

The winch apparatus 24 comprises a pair of elongated support arms 26. Each support arm 26 includes a pair of telescoping sections 28 and 30 whereby the length of each of the support arms can be selectively adjusted. For example, the support arm 28 may have a plurality of longitudinally spaced openings for registration with one or more of similar openings in the telescoping member 30. Each pair of telescoping members can be adjusted in length by aligning registering openings and inserting a pin 32 to maintain the support arm in its selected length. The lower or base ends of the support arms 26 are pivotally secured to brackets generally indicated at 34 in FIG. 2, a detailed description of which follows. The opposite outer ends of the support arms 26 are pivotally secured to a winch mounting element 36. Preferably, winch mounting element 36 comprises a plate 38 having a pair of rods 40 (FIG. 2) secured to the plate adjacent their upper ends and depending in spaced relation from the plate 38. The tips of the support arms 26 terminate in sleeves 42 for receiving the rods 40 when the plate 38 is pivotally mounted to each of the support arms 26. The lower ends of the rods 40 may project through the lower ends of the sleeves 42 and a retaining element, e.g., a pin, not shown, may be passed through an aperture in the lower end of each rod to retain the plate on the support arms.

Figure 5:
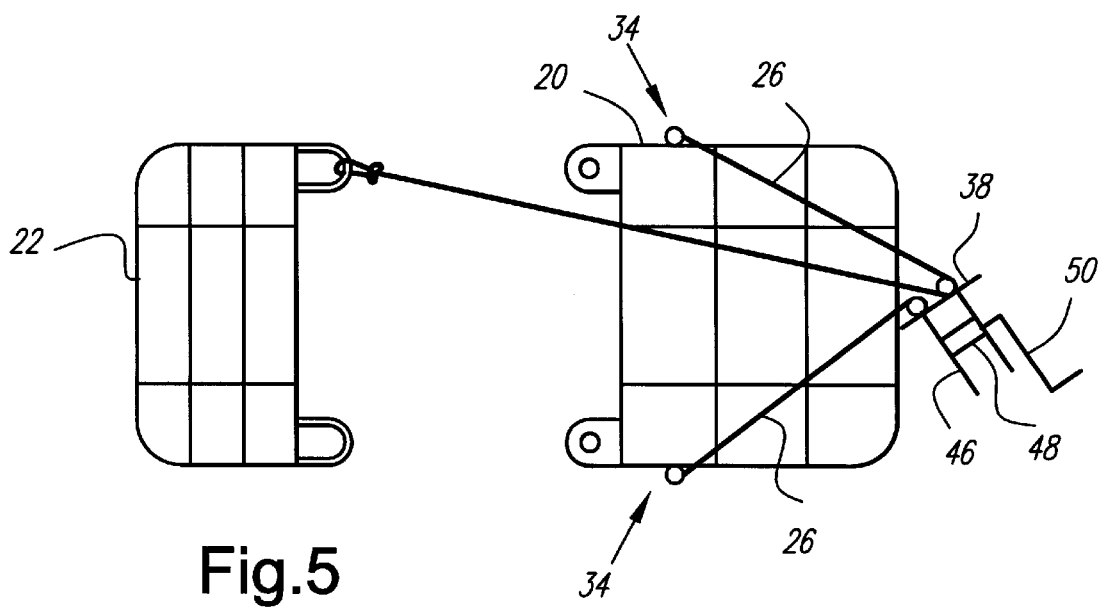
FIG. 5 is a schematic top plan view illustrating an operational configuration of the present invention.

The plate on the opposite side from the rods 40 mounts a manually operated winch including a reel 44. The winch is a conventional winch having a pair of side plates 46 (FIG. 5) secured to the plate 38 and carrying a reel 48 therebetween for rotation about an axis by rotating handle 50. The winch also has a suitable pawl and ratchet gear, as conventional, for holding the reel in position under the loading, the pawl and gear not being shown. As illustrated in FIG. 5, the plate 38 may be directed to one side or the other of the winching apparatus by adjusting the lengths of the support arms 26 and pivoting the plate 38 relative to the arms. It will be appreciated that when the winch is directed as illustrated in FIG. 5, i.e., to one side, the support arms 26 will not interfere with the rotation of the handle 50 during operation of the winch. Additionally, in FIGS. 2 and 5, there is also provided a line, preferably a chain 52 which is connected at its outer end to a link 54 secured to the backside of plate 38. Chain 52 is connected at its opposite end to a support structure on the vehicle, i.e., the front basket 22.

Figure 3:
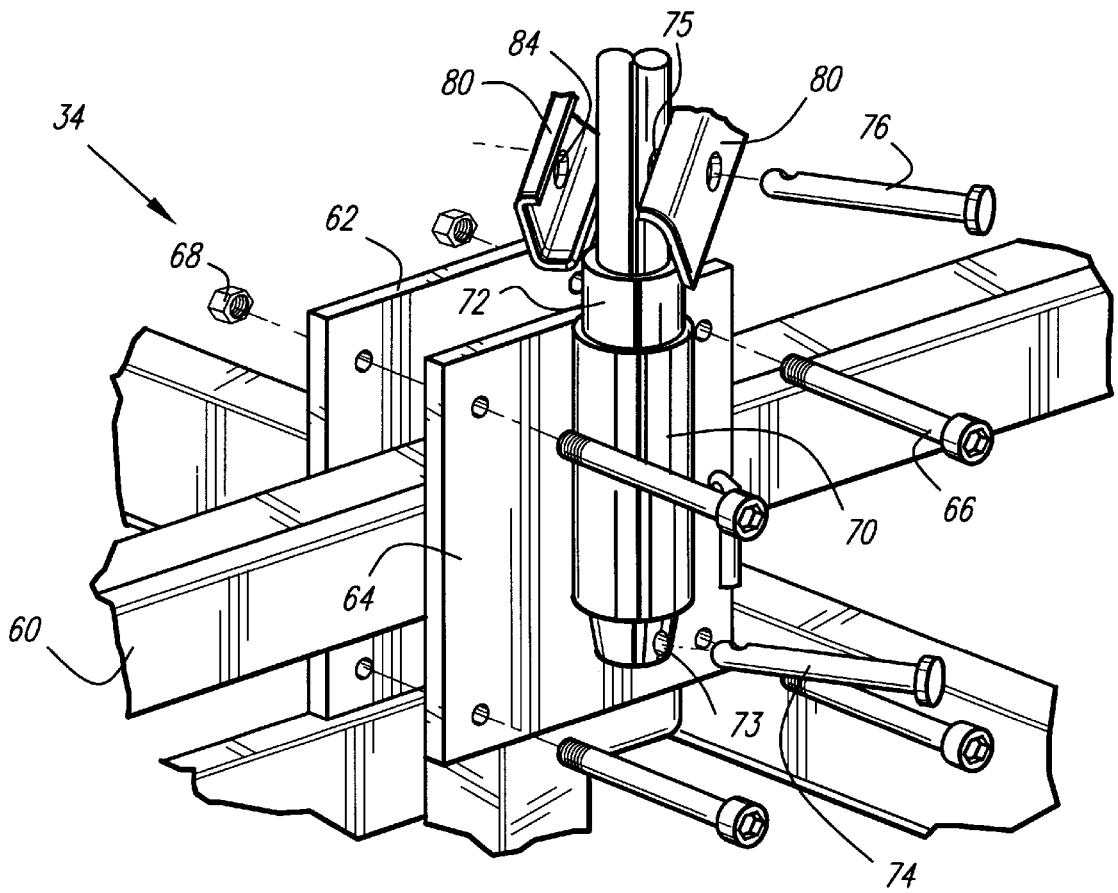
FIG. 3 is an enlarged fragmentary perspective view of a bracket for mounting one of the support arms to the basket of the all-terrain vehicle.

Referring now to FIG. 3, there is illustrated a preferred embodiment of a mounting bracket 34 for securing the winching apparatus to a square tubular portion 60 of the rear basket 20. The mounting bracket 34 includes a pair of side plates 62 and 64 which straddle the square tube 60. The plates 62 and 64 may be clamped to the square tube 60 by bolts 66 and nuts 68. Plate 64 includes a cylindrical sleeve 70 having a cylindrical opening. The opening receives a generally cylindrical rod 72, the lower end of which has a lateral aperture 73 for receiving a pin 74 whereby the rod 72 may be retained in sleeve 70. The upper end of the rod 72 is enlarged to seat on the upper margin of the sleeve 70. The upper end of rod 72 also has an aperture 75 for receiving a pin 76 for securing the lower or base end of the support arm 26 to the rod 72.

As illustrated in FIG. 3, the lower end or base end of each support arm 26 is bifurcated to form two arm portions 80 which lie on opposite sides of the rod 72. The arm portions 80 have aligned apertures 84 which when aligned with the aperture 75 through the rod 72 receive the pin 76 whereby the support arm 26 is pivotally connected to the sleeve 72 and hence secured to the all-terrain vehicle. It will be appreciated from a review of FIG. 3 that the pivotal axis of the rod 72 relative to the sleeve 70 and the axis of the support arm relative to the rod 72 are perpendicular to one another such that each support arm is free to rotate about a vertical axis and about a horizontal axis.

Figure 4:
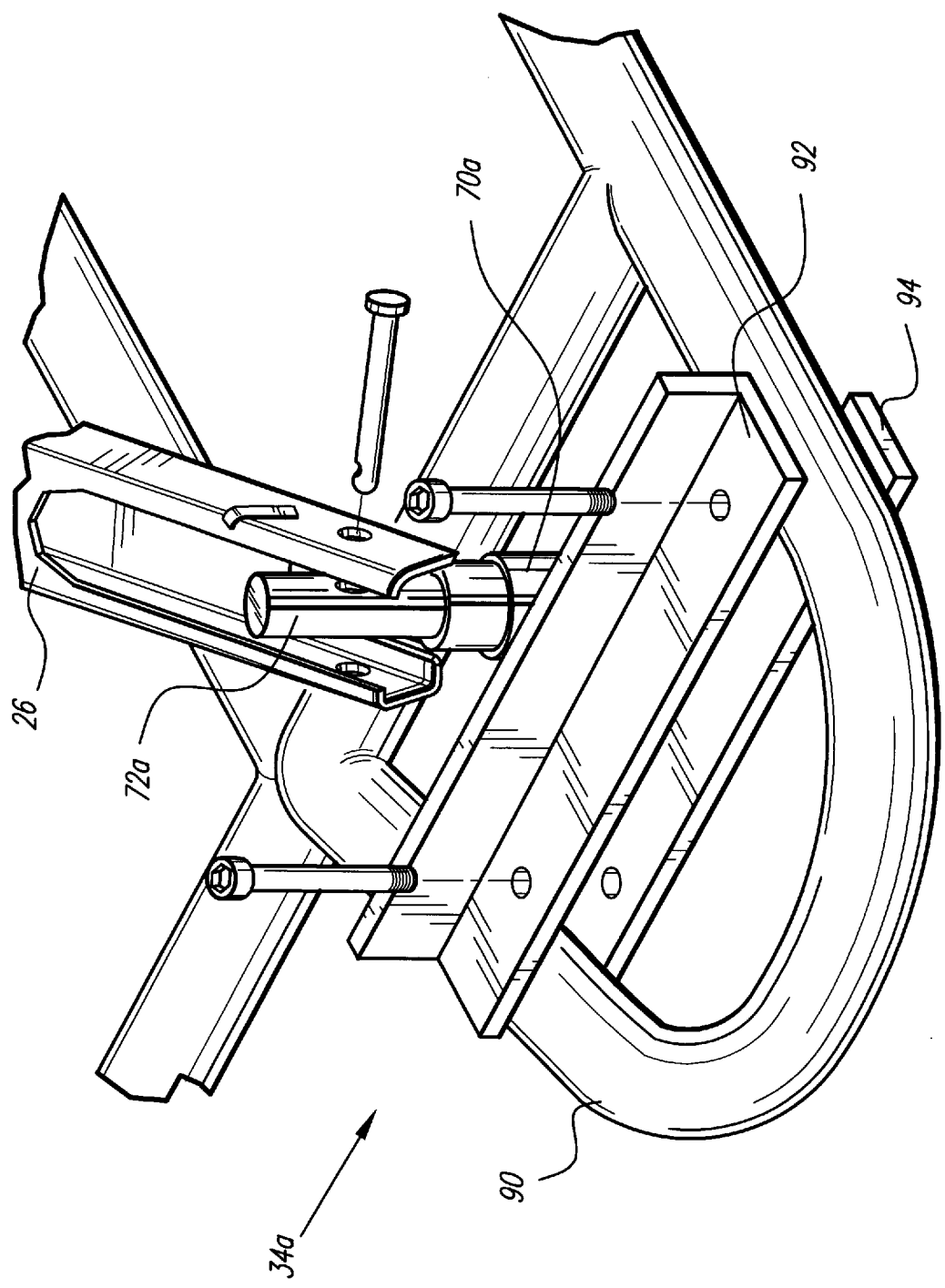
FIG. 4 is a perspective view of a bracket for mounting one of the support arms to a tube rack carried by the all-terrain vehicle.

Referring now to FIG. 4, there is illustrated a portion of a tube rack which, in lieu of a rear basket 20, may be provided on the rear end of an all-terrain vehicle. The tube rack includes tubes 90 which have a generally circular cross section. A mounting bracket 34A is provided for mounting the support arms 26 to the tube rack illustrated in FIG. 4. Preferably, the mounting bracket 34A includes an angle 92 and a flat plate 94. The angle 92 and plate 94 overlie and underlie, respectively, a pair of tubular portions and may be clamped to the tubular portion 90 by a pair of nuts and bolts as illustrated. The angle 92 mounts a sleeve 70A which in turn receives a rod 72A. The mounting of the support arm 26 to the rod 72A is similar as previously described in connection with FIG. 3. Thus, it will be appreciated that the winching apparatus of the present invention may be supported on an all-terrain vehicle having either a standard rear basket or a rear tube rack.

To use the winching apparatus of the present invention in connection with the vehicle, it will be appreciated that the vehicle, for example, the ATV, may be driven to the remote site with the winching apparatus in a disassembled condition, for example, carried in a duffle bag in the basket of the vehicle. At the site, the brackets 34 may be secured to the rear basket or tube rack as applicable. For example, referring to FIG. 3, the plates 62 and 64 may be secured on opposite sides of the square tube 60 by applying bolts 66 and nuts 68. The rods 72 may then be inserted into the sleeves 70 and the pins 74 inserted through the apertures at the bottom of the rods 72 to secure the rods in place but leaving the rods free for pivotal movement about a vertical axis. Next, the bifurcated ends of each support arm 26 are received about an upwardly projecting rod 72 and a pin 76 is inserted in the aligned openings 84 and the aperture through the rod 72 to pivotally secure the support arm for pivotal movement about a horizontal axis. The winch mounting plate 38 may then be secured to the opposite ends of the support arms 26 by inserting the rods 40 into the sleeves 42 and for example, applying a retainer clip or pin to the lower ends of the rods 40 after they are received in the sleeve 42. The chain 52 is then connected to the forward end of the vehicle and to the winch plate 38. By adjusting the lengths of the support arms 26, it will be appreciated that the plate 38 and hence the winch may be directed to one side of the winching apparatus, enabling rotation of the handle without interference from an opposite support arm. As a consequence, the winching apparatus is ready to be secured to a load, e.g., by using hook H. By rotating handle 50, the winch lifts the load until such time as it obtains an elevation whereby the load can be shifted laterally, for example, onto the rear basket 20. The hook H of the winch is then disconnected from the load and the winch may be disassembled or left in place while the ATV is used to transport the load to another site.

A similar type operation may be accomplished with the tube rack illustrated in FIG. 4. Where a tube rack is provided, the angle 92 and plate 94 may be clamped on opposite sides of the generally U-shaped tube 90, the rod 72A may be inserted in the sleeve 70A and the base of the support arm 26 is pivotally secured to the rod 72A. The operation of the winching apparatus with respect to the tube rack is similar to the operation of the winch apparatus with respect to the rear basket. It will also be appreciated that the mounting brackets 34, of each type, may be secured to the ATV and remain secured thereto without disassembly after each use. Thus, the support arms, winch and winch plate may be carried separately, e.g., in a duffle bag, with the mounting brackets securely mounted to the basket or tube rack. This, of course, lessens the assembly time.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus mountable on a vehicle for lifting loads comprising:
    a pair of elongated support arms;
    a pair of mounting brackets for attachment to the vehicle, each said support arm being pivotally mounted at one end to a respective mounting bracket for pivotal movement about generally perpendicular axes;
    a winch having a lifting line, a reel for the lifting line and carried for rotation about an axis and a handle for rotating the reel about said axis;
    a mounting element for carrying said winch; and
    a discrete pivotal connection between an end of each support arm opposite said one end and said mounting element enabling said winch and said mounting element to be directed to opposite sides of said arms.

2. The apparatus according to claim 1 wherein the discrete pivotal connections between said opposite ends of said support arms and said mounting element lie along said element at spaced locations relative to one another.

3. The apparatus according to claim 2 wherein said pivotal connections define generally spaced parallel axes.

4. The apparatus according to claim 1 wherein each said mounting bracket includes at least one plate, a cylindrical opening, and an upstanding cylindrical rod receivable in said opening for pivotal movement about one of said perpendicular axes, said rod and said arm being pivotally connected to one another.

5. Apparatus according to claim 4 including an aperture through said rod and a pin extending through said one end of said support arm and the aperture in said rod for pivotally mounting said support arm for pivotal movement about another of said perpendicular axes.

6. Apparatus according to claim 4 wherein each said mounting bracket includes a second plate, and bolts extending through said plates for clamping the plates to a support member carried by the vehicle.

7. Apparatus according to claim 1 including a chain for connecting between said mounting element and the vehicle.

8. In combination with an all-terrain vehicle having a body, wheels on said body and an engine carried by said body and a pair of fixed structural support members, a winching apparatus comprising a pair of elongated support arms, a pair of mounting brackets for securement to said structural support members carried by said vehicle, each said support arm being pivotally mounted at one end to a respective mounting bracket for pivotal movement about generally perpendicular axes, a winch having a lifting line, a reel for the lifting line and carried for rotation about an axis and a handle for rotating the reel about said axis, a mounting element for carrying said winch, and discrete pivotal connections between opposite ends of said support arms from said one end and said mounting element enabling said winch and said mounting element to be directed to opposite sides of said arms.

9. The combination of claim 8 wherein the discrete pivotal connections between said opposite ends of said support arms and said mounting element lie along said element at spaced locations relative to one another.

10. The combination of claim 9 wherein said pivotal connections define generally spaced parallel axes.

11. The combination of claim 8 wherein each said mounting bracket includes at least one plate, a cylindrical opening, and an upstanding cylindrical rod receivable in said opening for pivotal movement about one of said perpendicular axes, said rod and said arm being pivotally connected to one another.

12. The combination of claim 11 including an aperture through said rod and a pin extending through said one end of said support arm and the aperture in said rod for pivotally mounting said support arm for pivotal movement about another of said perpendicular axes.

13. The combination of claim 11 wherein each said mounting bracket includes a second plate, and bolts extending through said plates for clamping the plates to a support member carried by the vehicle.

14. Apparatus according to claim 8 including a chain for connecting between said mounting element and the vehicle.

* * * * *